United States Patent [19]

Nimura et al.

[11] Patent Number: 5,115,399

[45] Date of Patent: May 19, 1992

[54] POSITION INPUT SYSTEM FOR VEHICULAR NAVIGATION APPARATUS

[75] Inventors: Mitsuhiro Nimura; Shoji Yokoyama; Takashi Yamada; Koji Sumiya; Shuzo Moroto, all of Anjo, Japan

[73] Assignees: Kabushiki Kaisha Shinsangyokaihatsu; Aisin AW Co., Ltd., both of Japan

[21] Appl. No.: 618,021

[22] Filed: Nov. 26, 1990

Related U.S. Application Data

[63] Continuation of Ser. No. 290,202, Dec. 27, 1988, abandoned.

[30] Foreign Application Priority Data

Dec. 28, 1987 [JP] Japan ................... 62-333052

[51] Int. Cl.⁵ .................................... G06F 15/50
[52] U.S. Cl. .................... 364/449; 364/444; 340/990; 340/995
[58] Field of Search .......... 364/443, 444, 449; 340/988, 990, 995; 73/178 R

[56] References Cited

U.S. PATENT DOCUMENTS

| | | | |
|---|---|---|---|
| 4,763,270 | 8/1988 | Itoh et al. ................... | 340/990 |
| 4,774,672 | 9/1988 | Tsunoda et al. ............. | 340/995 |
| 4,782,447 | 11/1988 | Ueno et al. ................. | 340/995 |
| 4,792,907 | 12/1988 | Ikeda et al. ................. | 340/988 |
| 4,796,189 | 1/1989 | Nakayama et al. ......... | 340/995 |
| 4,812,845 | 3/1989 | Yamada et al. ............. | 364/449 |
| 4,814,989 | 3/1989 | Döbereiner et al. ........ | 340/988 |
| 4,827,420 | 5/1989 | Musa .......................... | 340/988 |

Primary Examiner—Gary Chin
Attorney, Agent, or Firm—Lorusso & Loud

[57] ABSTRACT

A position input system for a vehicular navigation apparatus includes an input unit for inputting a desired destination and a present position, a memory unit for storing desired destination information and map information, and a display unit for outputting the desired destination information and map information in response to input information from the input unit. The map information is indicative of intersections and a geographical point located between intersections and possessing useful guidance information. A desired destination and present position are capable of being inputted by setting the useful guidance information between a road leading to and a road leading from the geographical point. This makes it possible to enter position simply and accurately. Positions are precise since they are selected from pre-stored information relating to geographical locations. Vehicle direction can also be inputted in accurate fashion where parking lot exits and intersections are concerned.

5 Claims, 14 Drawing Sheets

Fig.6

NODE SERIES DATA

| NODE NO. | EAST LONGITUDE | NORTH LATITUDE | ATTRIBUTE |
|---|---|---|---|
| 0001 | 135.··· | 35.··· | 01 |
| 0002 | 135.··· | 35.··· | 00 |
|  |  |  |  |

Fig.7

INTERSECTION LIST

| CODE NO. | INTERSECTION NAME | INTERSECTION NO. | LANDMARK | ATTRIBUTE | CONNECTING INTERSECTION NO. (1) | CONNECTING INTERSECTION NO. (2) |
|---|---|---|---|---|---|---|
| 0101 | GION | 10 | MARUYAMA PARK | 01 | 2147 | 2152 |
| 0102 | KITANO HAKUBAICHO | 398 | GASOLINE STATION | 00 | 59 | 3096 |
|  |  |  |  |  |  |  |

Fig. 8

DESTINATION LIST

| CODE NO. | DESTINATION NAME | PARKING LOT NO. | CONNECTING INTERSECTION NO. (1) | CONNECTING INTERSECTION NO. (2) | PARKING LOT DIRECTION | PHOTO NO. (1) | PHOTO NO. (2) | EXIT PHOTO NO. | BLOCK | EAST LONGITUDE | NORTH LATITUDE |
|---|---|---|---|---|---|---|---|---|---|---|---|
| 0001 | ARASHIYAMA | 1 | 2103 | 2097 | -1 | 1121 | 0 | 0 | 0400 | 135.... | 35.... |
| 0012 | GINKAKU TEMPLE | 1 | 2153 | 2265 | +1 | 2019 | 2020 | 2021 | 0CFF | 135.... | 35.... |

ROAD DATA

| ROAD NO. | STARTING POINT INTERSECTION NO. | END POINT INTERSECTION NO. | NO. OF ROAD HAVING SAME STARTING POINT | NO. OF ROAD HAVING SAME END POINT | ROAD WIDTH | PROHIBITION (1) | PROHIBITION (2) | UNNECESSARY GUIDANCE | PHOTOGRAPH NO. | NUMBER OF NODES | LEADING ADDRESS OF NODE SERIES DATA |
|---|---|---|---|---|---|---|---|---|---|---|---|
| 1 | 1 | 2 | 7 | 4 | 1 | — | — | 3 | 1 | 15 | 100 |
| 2 | 2 | 1 | 3 | 8 | 1 | — | — | 7 | 2 | 13 | 200 |
| 3 | 2 | 3 | 2 | 3 | 2 | — | — | 5 | 3 | 9 | 300 |
| 4 | 3 | 2 | 5 | 6 | 2 | — | — | 2 | 4 | 20 | 400 |
| 5 | 3 | 4 | 4 | 7 | 2 | 6 | — | 8 | 5 | 25 | 500 |
| 6 | 4 | 2 | 8 | 1 | — | 3 | 2 | — | 6 | 30 | 600 |
| 7 | 1 | 4 | 1 | 5 | 0 | — | — | — | 7 | 9 | 700 |
| 8 | 4 | 1 | 6 | 2 | 0 | — | — | 1 | 8 | 3 | 800 |

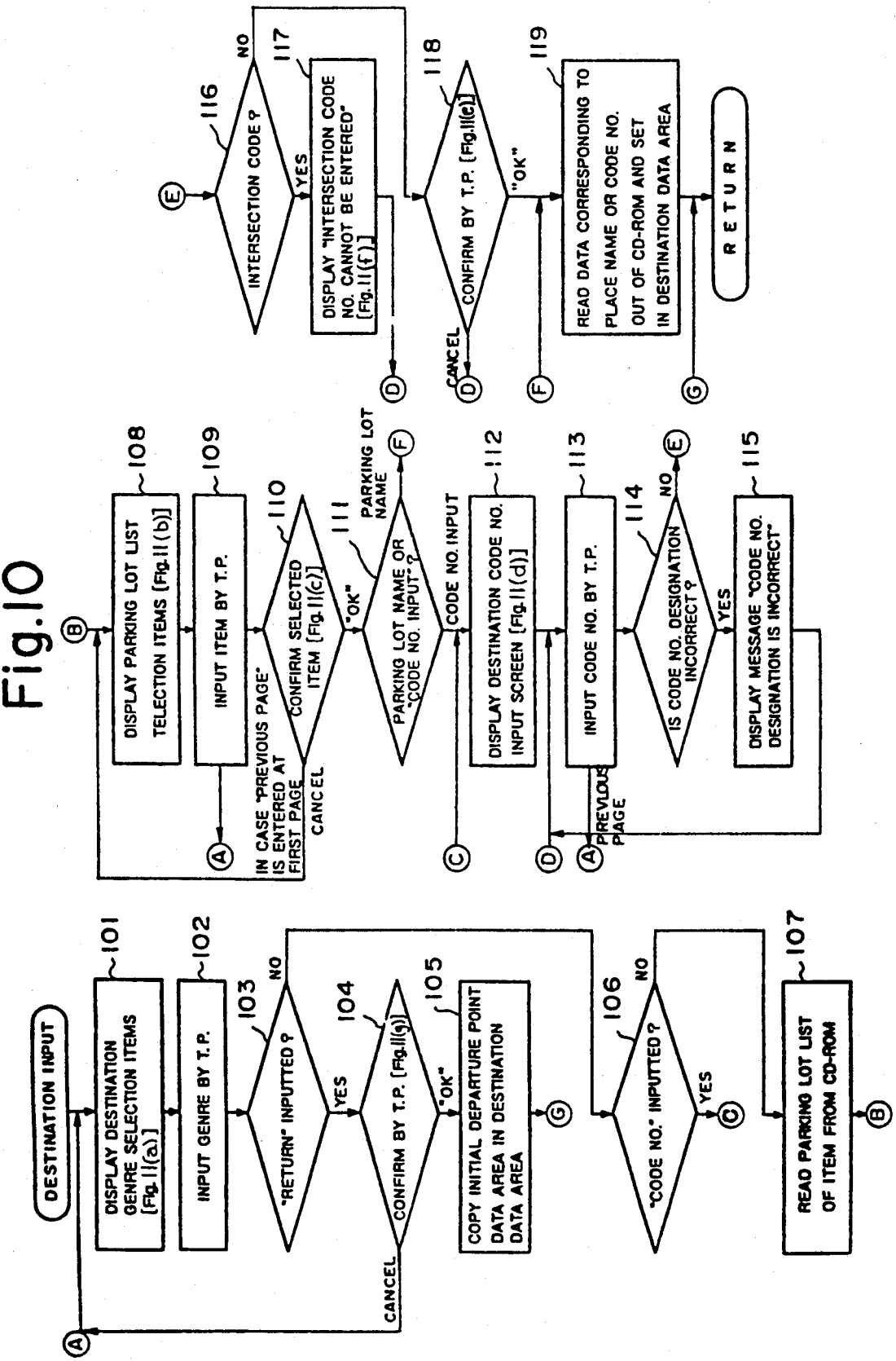

Fig.11 (a)

DESTINATION INPUT    SELECT DESTINATION

YOUR DESTINATION IS  IF INCORRECT,
PRESS HELP BUTTON AT LEFT AND
CHANGE DEPARTURE POINT.

| SIGHTSEEING | LODGINGS |
| DINING | SOUVENIRS |
| CODE NO. INPUT | RETURN |

Fig.11 (b)

— SELECTED GENRE

SIGHTSEEING    SELECT WHERE YOU WISH TO GO.

| ARASHIYAMA | IMPERIAL PALACE |
| KINKAKU TEMPLE | BOTANICAL GARDEN |
| GION | NANZEN TEMPLE |
| GINKAKU TEMPLE | CODE NO. INPUT |
| PREVIOUS PAGE | NEXT PAGE |

Fig.11 (c)

SIGHTSEEING    OK?

| ARASHIYAMA | IMPERIAL PALACE |
| KINKAKU TEMPLE | BOTANICAL GARDEN |
| GION | NANZEN TEMPLE |
| GINKAKU TEMPLE | CODE NO. INPUT |
|  | CANCEL |

Fig.II(d)

DESTINATION CODE NO. INPUT

| 1 | 2 | 3 |
| 4 | 5 | 6 |
| 7 | 8 | 9 |
| OK | 0 |   |

PREVIOUS PAGE

DESTINATION IS _____

| 1 | 2 | 3 |
| 4 | 5 | 6 |
| 7 | 8 | 9 |
| OK | 0 | CANCEL |

PREVIOUS PAGE

INTERSECTION CODE NO. CANNOT BE ENTERED

| 1 | 2 | 3 |
| 4 | 5 | 6 |
| 7 | 8 | 9 |
| OK | 0 |   |

PREVIOUS PAGE

Fig.II(g)

DO YOU WISH TO RETURN?

YES    NO

Fig. 14 (a)

DEPARTURE INTERSECTION CODE NO. INPUT

CONTINUE TRAVELLING STRAIGHT AHEAD UNTIL INTERSECTION HAVING A NAME IS PASSED, THEN STOP VEHICLE IMMEDIATELY AND ENTER THE CODE NO. OF
THE INTERSECTION (REFER TO INSTRUCTION MANUAL).

PREVIOUS PAGE    CODE NO. INPUT

Fig. 14 (b)

INTERSECTION CODE NO. INPUT

| 1 | 2 | 3 |
| 4 | 5 | 6 |
| 7 | 8 | 9 |
| OK | 0 | CANCEL |

PREVIOUS PAGE

NAME OF THE INTERSECTION IS _____.

| 1 | 2 | 3 |
| 4 | 5 | 6 |
| 7 | 8 | 9 |
| OK | 0 | CANCEL |

PREVIOUS PAGE

POSITION INPUT SYSTEM FOR VEHICULAR NAVIGATION APPARATUS

This application is a continuation of application Ser. No. 290,202, filed Dec. 27, 1988, now abandoned.

BACKGROUND OF THE INVENTION

This invention relates to a vehicular navigation apparatus which provides guidance along a path by outputting guidance information for travel to a desired destination.

A navigation apparatus for automotive vehicles is adapted to provide course guidance for travel to a desired destination to a driver who is unfamiliar with the local geography. Recent years have seen extensive development of such navigation apparatus.

Conventionally, a vehicular navigation apparatus relies upon so-called "route matching" in which a course is set from a starting point to a desired destination before the vehicle begins travelling, with course guidance being provided to the driver in accordance with the course set. In some of these apparatus, a map is displayed on the screen of a CRT and the course is superimposed on the map if the driver designates a specific course. In a case where the navigation apparatus designates an intersection at which a turn is to be made next in accordance with the preset course, the distance to this intersection is displayed numerically or in the form of a graph. When a turn is to be made at an intersection using such a navigation apparatus, the driver observes the course displayed on the map to decide the next intersection at which the turn is to be made, or the driver looks at the numeric or graph display to ascertain the distance to the intersection where the turn is to be made, thereby determining the proper intersection.

However, as mentioned above, the conventional navigation apparatus is such that a course is set from a starting point to a desired destination before the vehicle begins travelling and course guidance is provided to the driver in accordance with the course set. Consequently, if the driver should happen to mistake an intersection and depart from the set course, travel in accordance with the guidance provided by the navigation apparatus will not be able to continue unless the vehicle is returned to the set course. In addition, a decision as to whether or not a predetermined intersection has been passed as specified by the course guidance is based upon detection of travelled distance or a left or right turn as detected by a distance sensor or steering angle sensor, respectively. In actuality, however, detection of travelled distance and steering angle is susceptible to considerable error, which can cause the navigation apparatus to make errors in judgment.

In an effort to solve these problems, Japanese Patent Application Laid-Open (KOKAI) No. 62-51000 proposes a present position input system, which involves inputting the vehicle's present position on a map and displaying a list of place names. Inputting present position makes it possible to perform route matching in a continuous manner.

However, when teaching the navigation apparatus the present position in the system proposed in Japanese Patent Application Laid-Open (KOKAI) No. 62-51000, it is required that the present position on a road map appearing on a display screen be displayed in enlarged form by pressing, with the tip of one's finger, a touch panel on which the display image is superimposed. This makes the apparatus inconvenient to operate. Another problem is that present position cannot be taught correctly from the relationship between the display and the resolution of the touch panel. If the list of place names is displayed so that present position can be selected from the list, it will be necessary for the driver to turn a large number of pages on the display screen if there are many candidates for selection. Conversely, the system will lack comprehensiveness if too few candidates are made available.

The applicant has filed a patent application (U.S. Ser. No. 260,213, filed Oct. 20, 1988) proposing a novel navigation apparatus which relies upon an explorer system instead of the above-described route matching system. In accordance with this system, the coodinates of a plurality of geographical points (e.g., intersections, characterizing structures, etc.) are set and a desired destination is entered, whereupon a course is sought from each geographical point to the desired destination and outputted as guidance information. Navigation is possible even if distance, steering angle and geomagnetic sensors should happen to fail or even if these sensors are not provided. As a result, if the driver strays from a course or changes the desired destination, the apparatus readily provides the driver with guidance to the destination. However, a system through which desired destination, present position and the like can be inputted in simple fashion is required for this navigation apparatus.

SUMMARY OF THE INVENTION

Accordingly, an object of the present invention is to provide a position input system for a vehicular navigation apparatus in which position inputs can be made simply and correctly by obtaining a map in the form of intersections and geographical points located between intersections and possessing useful guidance information.

Another object of the present invention is to provide a position input system, which is particularly effective when applied to a navigation system in which when the coordinates of a plurality of geographical points (e.g., intersections, characterizing structures, etc.) are set and a desired destination is inputted, a course for travel to the destination is sought at each geographical point and outputted as guidance information.

According to the present invention, the foregoing objects are attained by providing a position input system for a vehicular navigation apparatus in which guidance information for travel to a desired destination is outputted upon inputting the desired destination, comprising an input unit for inputting a desired destination and a present position, a memory unit for storing desired destination information and map information, and a display unit for outputting the desired destination information and map information in response to the input information from the input unit, wherein the map information is information indicative of intersections and a geographical point located between intersections and possessing useful guidance information, wherein a desired destination and present position are capable of being inputted by setting the useful guidance information between a road leading to and a road leading from the geographical point.

In accordance with the present invention, as shown for example in FIG. 5, a map is not obtained merely in the form of intersections but also includes geographical points, shown in the form of nodes, having useful guidance information (e.g., bridges, rivers, buildings and gasoline stations) at points between intersections. Thus, nodes indicate point data representing map coordinates, and some of the nodes are intersections. Arcs indicate line data and represent portions of the roads. By adopting such an arrangement, a landmark serving as useful guidance information can be provided as data between roads (i.e., between two arcs) connecting node numbers on either side of a node number n of a particular intersection.

Thus, in accordance with the invention, obtaining a map as intersections and information relating to a geographical point located between intersections and possessing useful information makes it possible to input positions simply and accurately. More specifically, positions are precise since they are selected from pre-stored information relating to geographical locations. Vehicle direction can also be inputted in accurate fashion where parking lot exits and intersections are concerned.

In displaying a list of place names, display is made by class to facilitate retrieval. Even if a display of a list of place names is limited to place names which appear with comparative frequency in order to reduce the place names displayed, it is possible to input all geographical point information by code number. Furthermore, it is possible to play a voice track or display a message when operating the apparatus and coordinate selectable items on a display screen by using the same color to identify them, thereby eliminating the chance of error.

Moreover, when the invention is applied to a navigation system in which the coodinates of a plurality of geographical points (e.g., intersections, characterizing structures, etc.) are set and a desired destination is entered, whereupon a course is sought to the desired destination at each geographical point and outputted as guidance information, the advantage of simplified position input is accompanied by the ability to obtain guidance information from any geographical point whatsoever after a desired destination is designated. Furthermore, after the present position is specified and entered, merely inputting a trigger signal makes it possible to readily set the next geographical point as a guidance point in acordance with the guidance information for travel to the desired destination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5(a) through 9(b) are views useful in describing the structure of data according to the invention;

FIG. 10 is a flowchart illustrating an example of a desired destination input method;

FIGS. 11(a) to 11(g) illustrate examples of screens displayed in accordance with the method of FIG. 10;

DESCRIPTION OF THE PREFERRED EMBODIMENT

An embodiment of the invention will now be described in detail with reference to the drawings.

Figure 1:
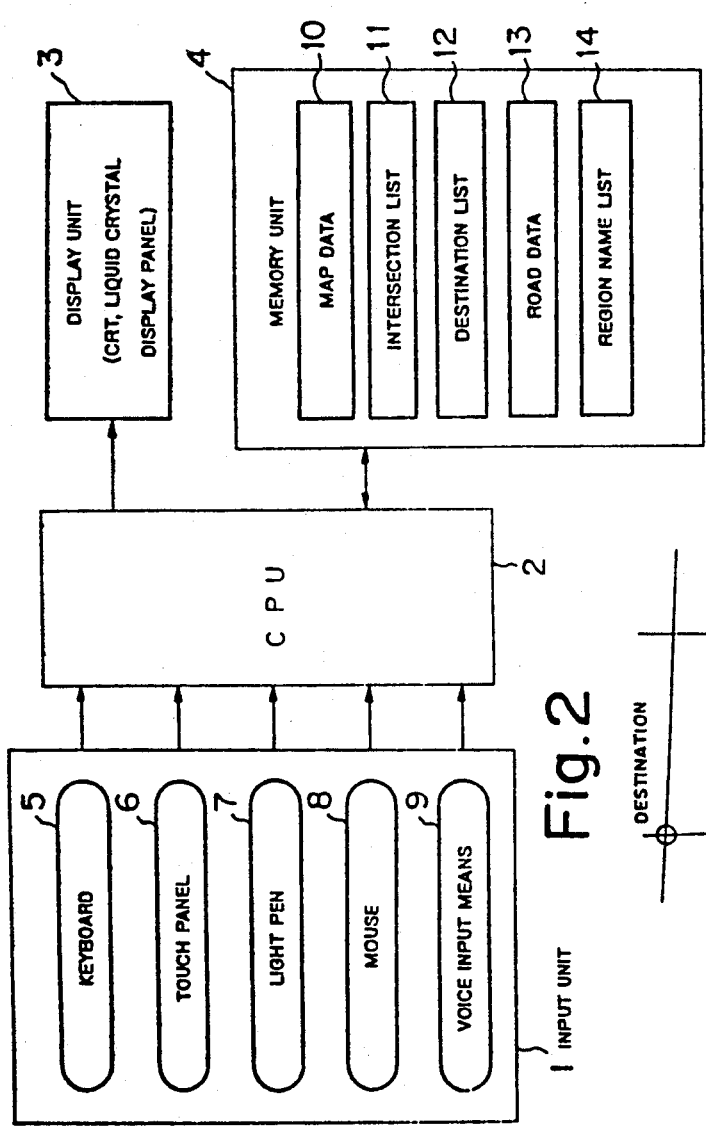
FIG. 1 is a block diagram illustrating the construction of an embodiment of a navigation apparatus according to the present invention.

As shown in FIG. 1, a navigation apparatus according to the invention comprises input means 1, a CPU 2, a display unit 3 such as a CRT or liquid crystal display panel, and a memory unit 4. The input unit 1 includes a keyboard 5 comprising a ten-key pad and function keys for inputting code numbers of predetermined geographical locations, such as a desired destination and present position (guidance location). A touch panel 6, light pen 7, mouse 8 or voice input means 9 may be employed instead of the keyboard 5. The memory unit 4 is a memory such as a CD-ROM in which network data indicative of geographical points, namely desired destination and present position, and other information are stored in advance. As will be described below, map data 10, a list 11 of intersections, a list 12 of desired destinations, road data 13 and a list 14 of regions are stored.

Figure 2:
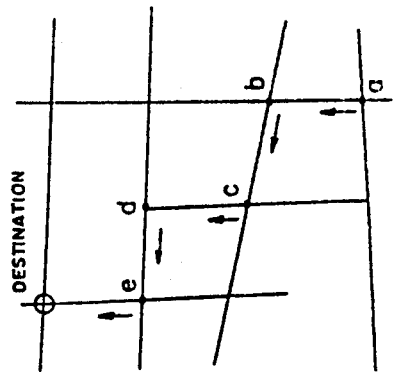
FIG. 2 is a diagram illustrating one example of a route sequence.

When a desired destination is designated by an input from the input means 1, the CPU 2 sets information for travel to the desired destination, by a method such as course exploration, in accordance with each geographical point stored in the memory unit 4, and stores this information in a memory such as a RAM. When present position information is entered by the input means 1, the display unit 3 outputs guidance information for this point. If only intersections serve as geographical points, the outputted guidance information is that for travel to the next intersection, such as an indication of a left or right turn, at the intersection serving as the guidance point. In a case where there is a second intersection encountered immediately after turning at the aforementioned next intersection, it is of course possible for the outputted guidance information to include the direction of the first turn along with information designating the proper lane to take after the turn, as well as the direction of the second turn and the associated guidance information. For example, the display unit can output guidance information relating to a course leading to a desired destination in accordance with the path sequence a, b, c, ... shown in FIG. 2.

Figure 3:
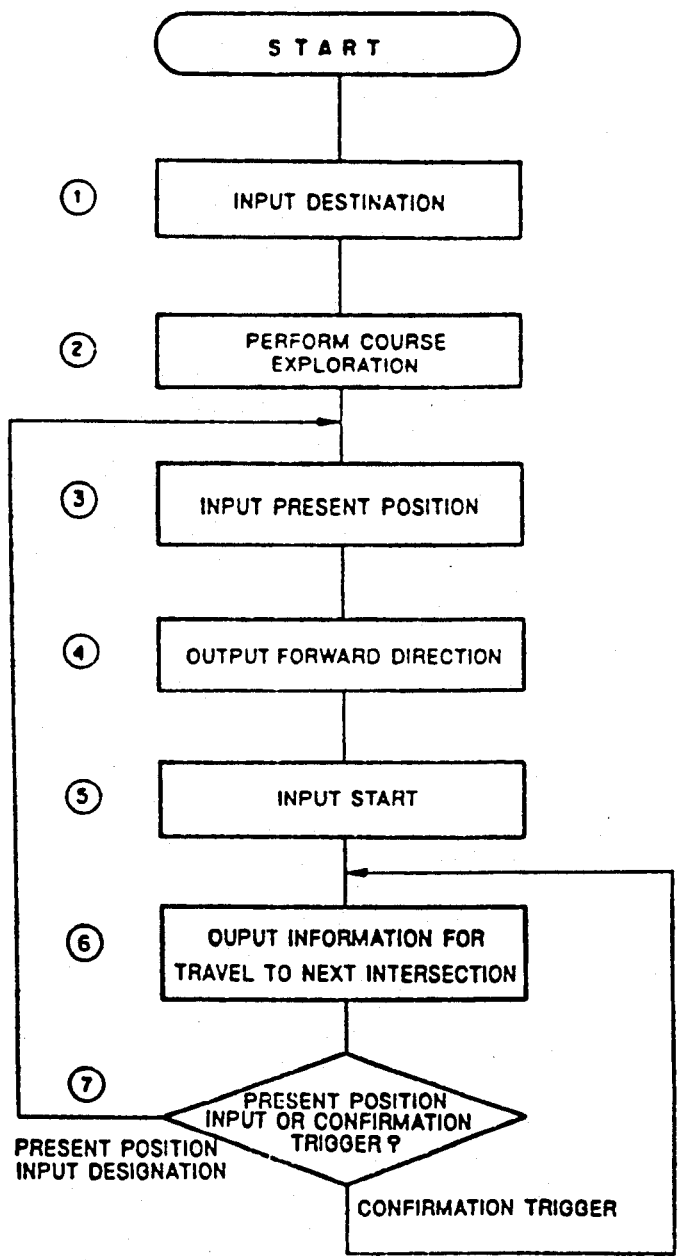
FIG. 3 is a flowchart of navigation processing according to the invention.

Processing associated with the navigation apparatus of the invention will now be described with reference to the flowchart of FIG. 3.

When the driver enters the code of a desired destination at a step (1) of the flowchart, a course exploration mode is established in which information for travel to the desired destination is set for all geographical points with the exception of the entered desired destination (step 2). When course exploration ends, a present position input mode is established, in which the driver inputs the code of his present position (step 3). When this is done, the proper direction of forward travel from this position is outputted (step 4). Next, when the driver inputs an intersection verification trigger (i.e., when a start input is made) at step (5), information for travel to a destination which is the next intersection is outputted (step 6). This is followed by step (7), at which monitoring is performed to see whether the intersection verification trigger or a signal from a present-position input button has been entered. If the present position input button has been pressed, the program returns to the processing of step (3). In other words, in accordance with this system, a trigger is inputted each time an intersection is verified providing that the vehicle is travelling as per instructions. If the vehicle strays from the instructed course and the driver notices this only after the vehicle has travelled to another intersection, the present position input button is pressed. Accordingly, whenever a trigger is inputted, guidance information relating to an intersection on a route leading to the desired destination is outputted in sequential fashion. When the present position input button is pressed, the present position input mode is established.

Figure 4:
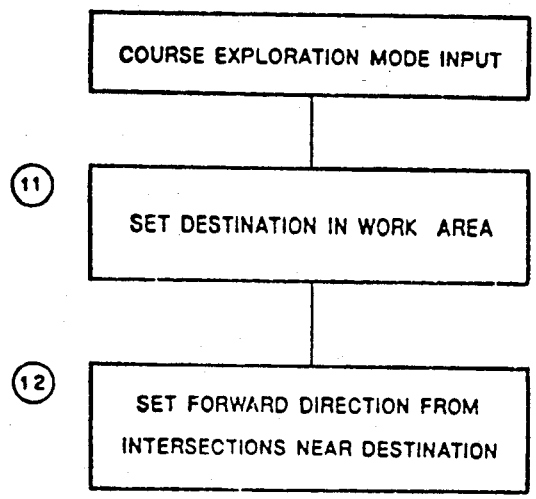
FIGS. 4(a) and 4(b) are useful in describing course exploration processing.
Figure 4:
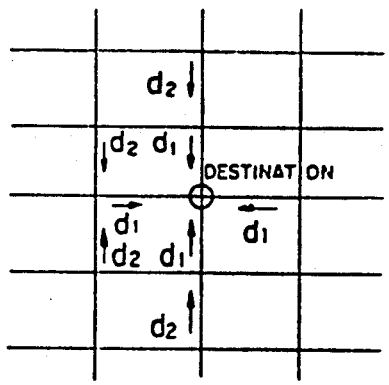

The course exploration processing of step (2) will now be described with reference to FIGS. 4(a) and (b). When the couse exploration input mode is established, as shown in FIG. 4(a), first the desired destination is set in a work area at step (11), after which forward directions from intersections near the destination are set at step (12). As shown in FIG. 4(b), the set forward directions include forward directions $d_1$ at intersections before the destination, and forward directions $d_2$ at intersections before the first-mentioned intersections. It is permissible to execute this course exploration after the processing of step (3) in FIG. 3, in which case course exploration would be performed whenever present position is inputted. Furthermore, since guidance information is outputted in response to the trigger input in accordance with the route set as a result of course exploration, the pertinent intersections are limited in number. Accordingly, it will suffice to provide guidance information solely for these intersections, thereby minimizing the information required.

The characterizing feature of the present invention, specifically a system for inputting the desired destination or present position, will now be described with reference to FIGS. 5 through 9.

FIGS. 5 through 9 illustrate the structure of data in accordance with the invention.

Figure 5:
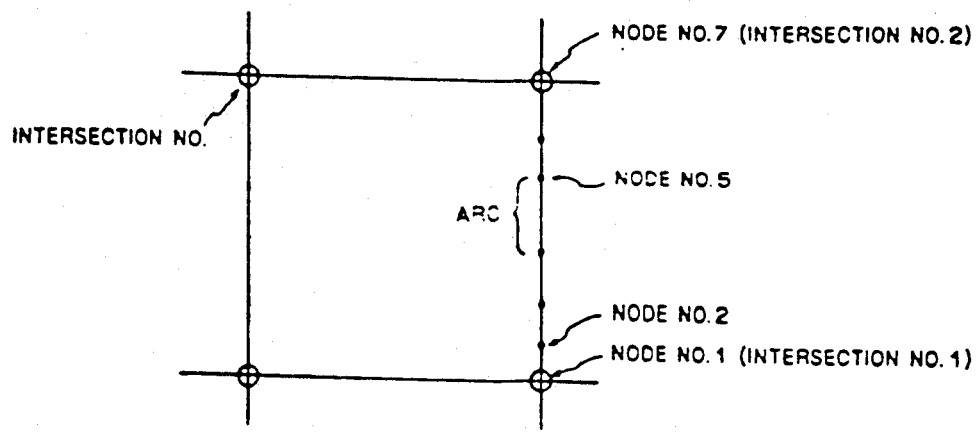
Figure 5:
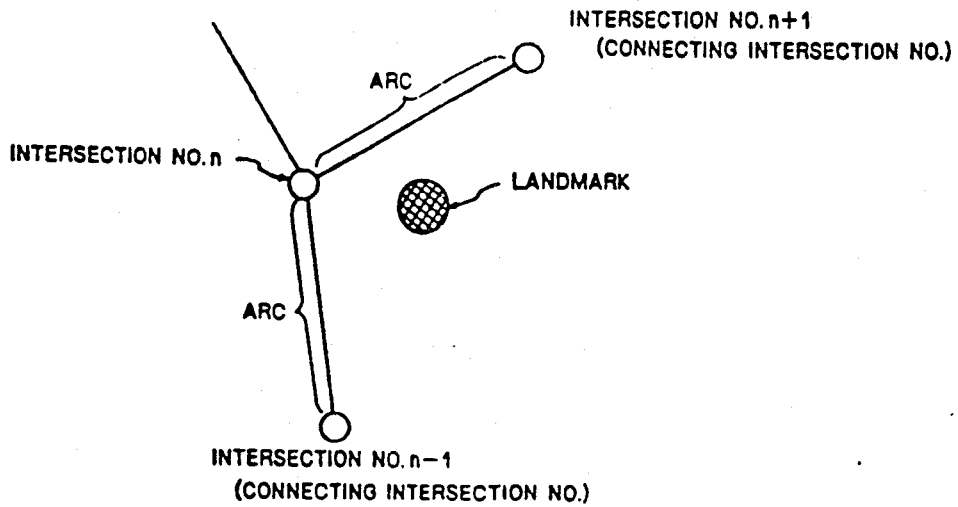

FIG. 5 is a diagram useful in describing the fundamental approach adopted in forming map data. As shown in FIG. 5(a), a map is not construed merely an intersections but also includes nodes, which are points having useful guidance information (e.g., bridges, rivers, buildings, gasoline stations, etc.) at geographical points between intersections. Thus, nodes indicate point data representing map coordinates, and some of the nodes are intersections. Arcs indicate line data and represent portions of the roads. By adopting such an arrangement, a landmark serving as useful guidance information can be provided as data between roads (i.e., between two arcs) connecting node numbers on either side of a node number n of an intersection depicted in FIG. 5(b).

FIG. 6 illustrates node series data. What is stored are east longitude and north latitude, namely the coordinates of the pertinent geographical point, for each node number, as well as the attribute which distinguishes the effective guidance information (e.g., bridges, rivers, buildings, gasoline stations) as data for each node number.

FIG. 7 illustrates an example of an intersection list, in which there are stored the code numbers of the intersections, the intersection names, the intersection numbers (numbers assigned only to those of the nodes that are intersections), the node numbers of two connecting nodes, as described above with reference to FIG. 5(b), the names of landmarks and attributes.

FIG. 8 illustrates an example of a desired destination list, in which there are stored code numbers, the names of desired destinations, parking lot numbers, the numbers of two connecting intersections connecting a desired destination, the directions of parking lots (whether a parking lot is on the left or right side of a road or straight ahead), the numbers of photographs of connecting intersections, the numbers of photographs of parking lot exits, block data for each region, and coordinates (east longitude, west latitude). The arrangement is such that the attribute of each desired destination is distinguishable by class. For example, the following numbers can be assigned to the most significant bits of code numbers to indicate class: 0 (sightseeing), 1 (public facility), 2 (lodgings), 3 (dining), 4 (place of business), 5 (gasoline station), 6 (intersection), 7 (parking lot), 8 (souvenirs), and other attribute data can be provided if desired. These desired destination data indicate parking areas near the desired destinations. If a desired destination is a parking lot, the driver is informed of the connecting intersection numbers, the direction of the parking lot (whether it is on the left or right side of a road or straight ahead), the photograph numbers of the connecting intersections and the photograph numbers of the parking lot exit. Thus, the driver is guided in positive fashion until the vehicle arrives at its final destination.

FIG. 9(a) illustrates an example of road data. As shown in FIG. 9(b), each road is assigned a road number(s) along with the direction(s) of traffic flow. The stored road data include, for each road number, the node numbers of starting and end points of the road, the number of a road having the same starting point, the number of a road having the same end point, road width, information relating to prohibitions, information relating to guidance not required (as when the driver need only continue travelling straight ahead), photograph numbers, the numbers of nodes, the leading addresses of node series data, length, etc.

Destination input will now be described with reference to FIGS. 10 and 11.

FIG. 10 is a flowchart of the associated processing. A step 101 calls for the screen shown in FIG. 11(a) to be displayed as a desired destination input. This screen is for indicating the different classes which can be displayed in selecting the destination. Items which appear frequently, such as "SIGHTSEEING", "LODGINGS", "DINING", "SOUVENIRS", "CODE NO. INPUT", "RETURN" are displayed in red as selectable items, and a desired class is selected by touch-panel input at step 102. Next, it is determined at step 103 whether "RETURN" on the screen of FIG. 11(a) has been inputted. If the answer is NO, it is determined at step 106 whether "CODE NO." has been inputted. If the answer received here is YES, then the program proceeds to step 112.

If a NO answer is received at step 106, the program proceeds to step 107, at which a list of parking lots (destinations) for the selected item are read in from the CD-ROM, whereupon the screen shown in FIG. 11(b) is displayed at step 108. At the same time, a voice track "SELECT YOUR DESIRED DESTINATION" is played. Here also items are displayed in the order of their popularity. By touching a "PREVIOUS PAGE" or "NEXT PAGE" key, parking lots can be brought to the screen and a desired parking lot can be selected. All of the input display sections are displayed in the color red. The last item in the display is the "CODE INPUT NO. INPUT" item. If "PREVIOUS PAGE" is entered at the first page, the program returns to step 101.

When a desired parking lot is inputted by the touch panel (step 109), a confirmation screen shown in FIG. 11(c) is displayed at step 110. Here the selected item is backlighted in, say, the color blue, while the other items appear in dark blue, so that the driver may easily confirm the selection made. If "CANCEL" is pressed, the program returns to step 108. If OK is pressed, it is determined at step 111 whether the name of a parking lot has been inputted or a code number. If the name of a parking lot is the desired destination, the program proceeds to step 119, where data corresponding to the name of the parking lot are read from the CD-ROM and set in the memory area of the CPU.

When a change is made in the code number input at step 111, or when code number input is selected at step 106, a code number input screen shown in FIG. 11(d) is displayed at step 112, after which a desired parking lot code number is inputted from the touch panel at step 113. It is then determined at a step 114 whether the code number designation is erroneous. If it is, step 115 calls for display of a message reading "CODE NO. DESIGNATION IS INCORRECT" and the program returns to step 113. If the code number designation is correct, then it is determined at step 116 whether the code number is an intersection code. If it is not an intersection code, the program proceeds to step 118, at which the desired destination is displayed automatically, as shown in FIG. 11(e). If the "OK" key is pressed, the program proceeds to step 119, at which data corresponding to parking lot name are read out of the CD-ROM and set in the memory area of the CPU. The program returns to step 113 if "CANCEL" is pressed.

If the code number designated at step 116 is indicative of an intersection, a message reading "INTERSECTION CODE NO. CANNOT BE ENTERED", which is shown in FIG. 11(f), is displayed at step 117 and the program returns to step 113. When "RETURN" is inputted at step 101 in execution of the above routine, the screen of FIG. 11(g) is displayed through steps 103, 104. If the driver presses "OK", the initial departure point data are copied in the desired destination storage area at step 105.

Input of present position at an intersection will now be described with reference to FIGS. 12 through 14.

Figure 12:
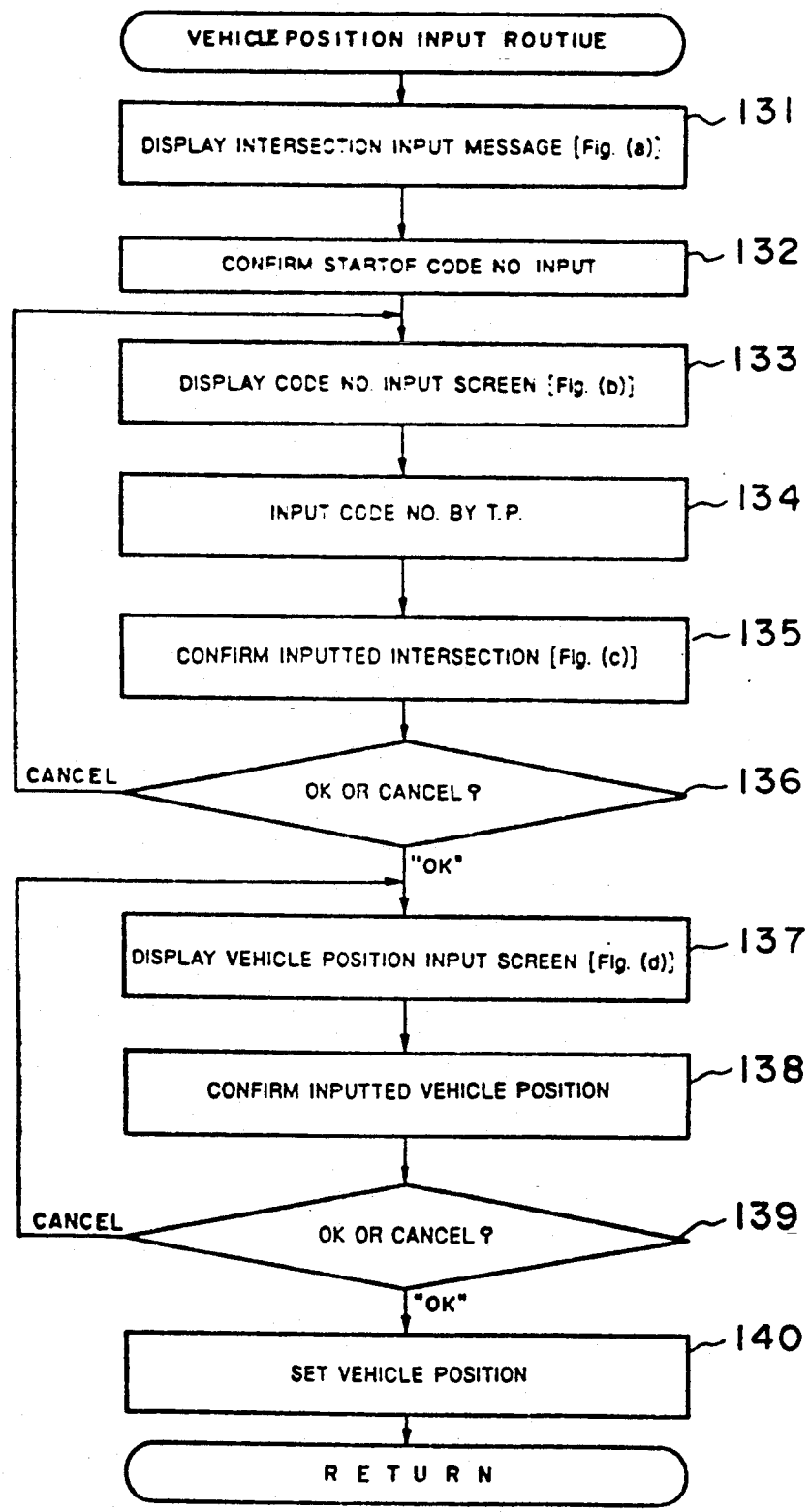
FIGS. 12 and 13 are flowcharts illustrating an example of a present position input method.

FIG. 12 is a flowchart of processing for setting the position of an automotive vehicle. Step 131 of the flowchart calls for display of a message, shown in FIG. 14(a), requesting entry of the name of an intersection. In response to the message, the driver continues driving straight ahead until an intersection having a name is passed, whereupon the driver immediately stops the vehicle and enters the intersection number (step 132) while referring to an instruction manual. When this is done, a code number input screen shown in FIG. 14(b) is displayed at step 133 and the code number is inputted by the touch panel at step 134, in response to which the name of the intersection shown in FIG. 14(c) is displayed at step 135. If the entered code number is incorrect, a message to this effect will be displayed at this time.

Next, it is determined at step 136 whether the name of the intersection is "OK" or is to be cancelled. If "CANCEL" is pressed, the program returns to step 133. If "OK" is pressed, processing for displaying a vehicle position input screen is executed at step 137 and the screen shown in FIG. 14(d) is displayed. Here the node data inputted by code number is read from the map data and the shape of the intersection is displayed based on the data indicative of the arcs connected to this intersection. In addition, the numbers of the roads leading to the intersection are displayed on the roads so that the road number can be entered from the ten-key pad. As shown in FIG. 14(d), only those keys corresponding to the intersection road numbers are displayed in, for example, the color red. Further, the location of a landmark is displayed at the position of a line segment bisecting the angle formed by two arcs, and the name of the landmark is displayed as well.

When the driver enters the number of the road on which the vehicle is presently located while referring to the location of the landmark, a screen such as that shown in FIG. 14(e) is displayed at step 138. This screen calls for the driver to confirm the number of the road on which the vehicle is presently located. Step 139 calls for the driver to press "OK" or "CANCEL". The program returns to step 137 if "CANCEL" is pressed. If "OK" is pressed, a location that is a predetermined distance (e.g., 70 m) from the starting point node on the designated arc is set as the vehicle position at step 140.

Figure 13:
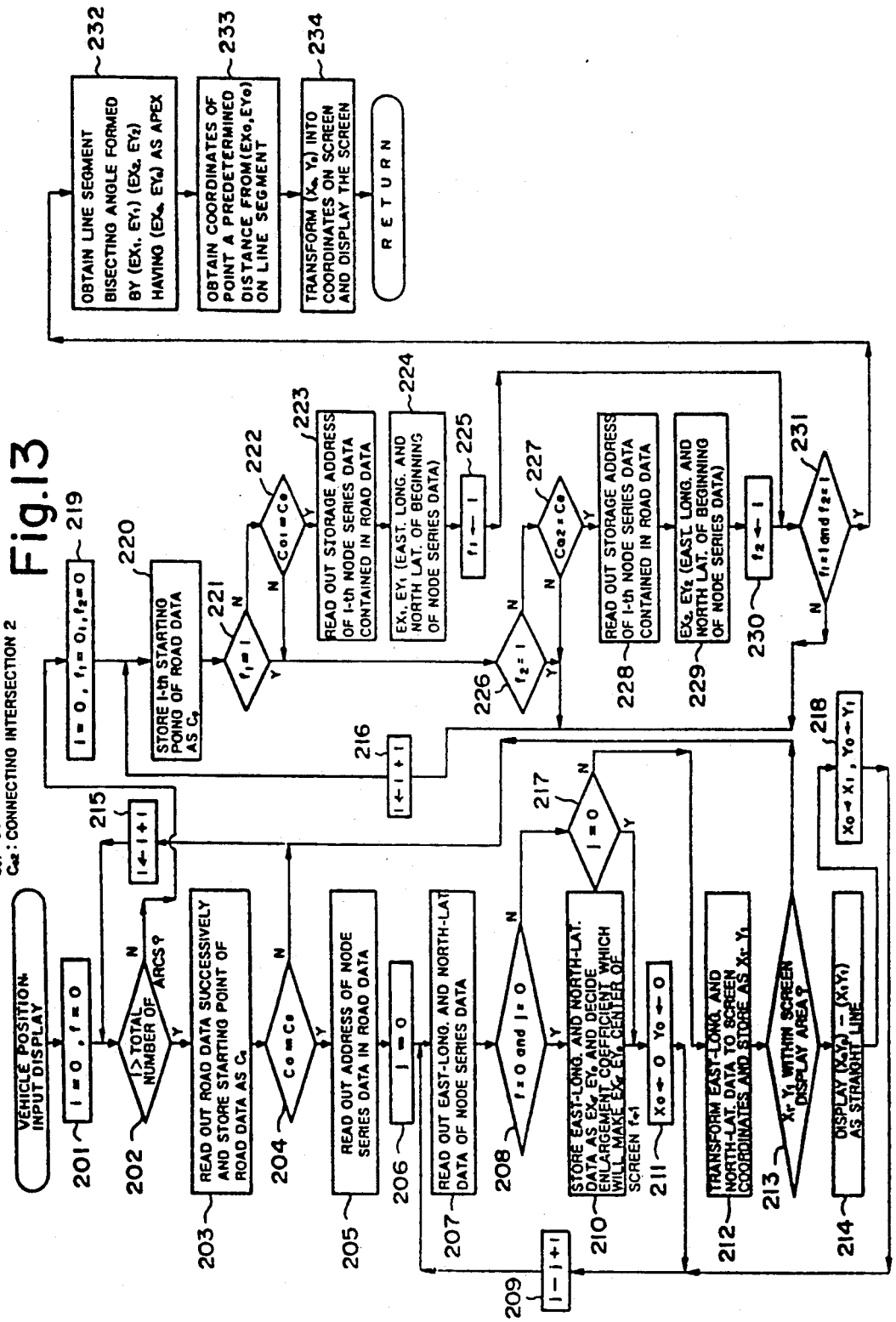
Figure 14:
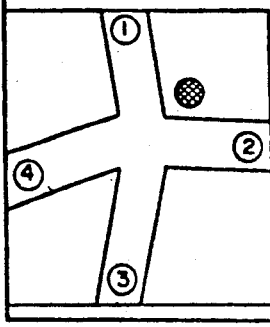
FIGS. 14(a) to 14(e) illustrate examples of screens displayed in accordance with the method of FIGS. 12 and 13.
Figure 14:
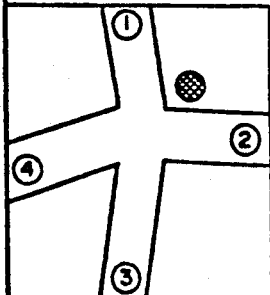

FIG. 13 is a flowchart of processing for displaying the vehicle position input screen of step 137.

Figure 9:
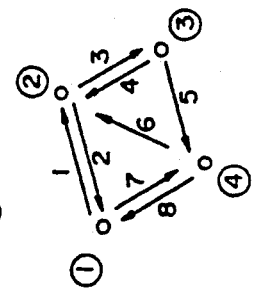

With regard to the shape of the intersection on the screen of FIG. 14(e), first an intersection number $C_o$ is specified by inputting the name of the intersection using a code number. On the basis of this intersection number $C_o$, roads leading to the intersection designated as a starting point, namely roads which include the designated intersection, are selected from the arc and road data (FIG. 9). Then, from the leading address of the node series data, the node series data of FIG. 6 are transformed from map coordinates to screen coordinates and displayed. This will now be described in greater detail.

With reference to FIG. 9, assume that intersection number (2) is designated by designating its intersection code number. In such case, roads which include intersection number (2) are retrieved from the starting point data contained in the road data (the loop of steps 202, 203, 204, 215). When this is done, road number 2 whose starting point is 2 is found, and the leading address 200 of the node series data representative of this road can be read out of memory (step 205). Though a screen is displayed based on the east-longitude and north-latitude data contained in the node series data, it is required, with regard to the initial data, to determine transformation equations for dealing with the transformation from the east-longitude and north-latitude data to the screen coordinates (j=0, f=0, step 208). The node series data represent a sequence of nodes which include intersections located between intersections, and the east longitude and north latitude of intersection number (2) are the initial data of the node sequence from address 200. The east longitude and north latitude are stored as $EX_o$, $EY_o$, and from an enlargement coefficient a we have $$X = EX_o \times a + bx, \quad Y = EY_o \times a + by$$

In accordance with the transformation equations for the transformation to the screen coordinates (X,Y), bx, by are decided in such a manner that $EX_o$, $EY_o$ are obtained at the center of the screen when X=0, Y=0 hold. At this time a flag f indicating that the transformation coefficient has already been decided is set to 1 (step 210). As a result, step 210 is not traversed in subsequent processing. Thus, it is possible to transform the coordinates of intersection (2) to the center of the screen where the screen coordinates are (0,0), and a starting point $X_o$, $Y_o$ for painting a straight line on the screen is made 0 at step 211.

Subsequent processing involves sequentially reading out node series data (step 207), effecting the transformation into screen coordinates, storing the results as $X_1$, $Y_1$ and painting straight lines on the screen based on the screen coordinates of the immediately preceding node (steps 212, 214). By repeating this processing, a road is painted from intersection number (2) to intersection number (1). As for escaping from this loop of the program, the painting of one road is assumed to end (step 213) when $X_1$, $Y_1$ calculated at step 212 are outside a predetermined screen coordinate area. Then a road having (2) as its starting point number is again retrieved from the road data of FIG. 9 and road number (3) is found (steps 202, 203). The node series data are then read out of memory and painting of a road from intersection number (2) is again carried out. However, since the initial data at address 300 are the same as $EX_o$, $EY_o$ read out previously, X and Y are made 0 (steps 217, 211). By repeating the foregoing processing, road numbers 2, 3 are painted from intersection number (2) to each of the other intersections within the limits of display screen. This ends processing for displaying the shape of the intersection.

When the display of the shape of the intersection ends, processing for the display of the landmark position is performed starting from step 219 on the basis of the intersection list data, road data and node series data. In the intersection list data, two intersection numbers $C_{o1}$, $C_{o2}$ are indicated as connecting intersections. Assuming that these are intersections (3), (4) in FIG. 9, the landmark is displayed at the angle formed by intersections (2), (3), (4). The roads which include the intersection (3) as starting point are retrieved from the road data, whereby road number 4 is found. East-longitude and north-latitude data contained in the node series data are read from the node series data address of this road, these data are stored as $EX_1$, $EY_1$, and a flag $f_1$ indicating that the coordinates of the first connecting intersection have been set is made 1 (steps 223-225). Similarly, east-longitude and north-latitude data for intersection number (4) are stored as $EX_2$, $EY_2$. By means of the foregoing processing, coordinate data for the intersections (2), (3) and (4) are stored as $(EX_o,EY_o)$, $(EX_1,EY_1)$ and $(EX_2,EY_2)$, respectively. A line segment which bisects the angle formed by these intersections is obtained from these coordinates (step 232), the coordinates of a point a predetermined distance from $(EX_o,EY_o)$ are made $(X_o,Y_o)$ (step 233), and these coordinates are transformed into screen coordinates by the transformation equations obtained at step 210. As a result, the landmark is displayed.

The present invention is not limited to the foregoing embodiment but can be modified in various ways.

For example, though it is described in the above embodiment that destinations and intersections are inputted by entering code numbers, data indicative of Japanese kana characters or Roman letters can be provided as the destination and intersection data and these can be inputted by character retrieval.

Further, it is permissible to adopt an arrangement in which the conventional set-up provided with a distance sensor or steering sensor is combined with the navigation apparatus of the present invention. The resulting system can be adapted in such a manner that, rather than the next geographical point being identified only when a switch is operated by the driver, the navigation apparatus identifies predetermined geographical points automatically by other means and changes over the guidance information delivered to the driver each time.

With a combination of the present invention and the conventional system, it can be so arranged that a region having a simple road network, such as only a single road, is handled by the conventional system having the sensors, while a region having a complicated road network is dealt with by the system of the present invention. It can also be so arranged that the navigation apparatus of the present invention is used as a back-up if the conventional navigation apparatus fails.

It is also possible to provide information relating to the distances between geographical points at which guidance is given, determine distance by a distance sensor and then urge the driver to input the next geographical point (i.e., to make a trigger input) by a voice track or visual display.

Further, in a case where it is arranged so that the driver can set a desired course, such as a route along back roads or a route along a principal road, each geographical point can be provided with information indicating whether the point is on a route of the desired category (i.e., back road or principal road). By designating the category of road desired in the setting of the guidance information, course exploration can be carried out solely in terms of the geographical points along routes of the desired type.

As many apparently widely different embodiments of the present invention can be made without departing from the spirit and scope thereof, it is to be understood that the invention is not limited to the specific embodiments thereof except as defined in the appended claims.

What is claimed is:

1. A navigation system for a vehicle having a position input system for assisting vehicle navigation to a desired destination, which comprises:

input means for inputting said desired destination and for inputting a present intersection position in terms of characters or code numbers identifying the present intersection;

memory means for storing information about said desired destination and map information; said map information including an intersection list and a road data list; said intersection list including information of landmarks located in the vicinity of respective intersections; said road data list including starting point intersection information and ending point intersection information;

display means for displaying guidance information; and control means for controlling said display means to display the present intersection, roads in said road data list having starting point information corresponding to said intersection and a landmark in the vicinity of said intersection, wherein said control means includes means for determining a line bisecting an angle between two roads displayed on said display means and intersecting at said intersection, and means for positioning the display of the landmark on the bisecting line a selected distance from said intersection;

said input means further including means for inputting a present road position by identifying one of said displayed roads relative to said landmark as displayed on said display means.

2. The system according to claim 1, wherein said desired destination is a parking lot.

3. The system according to claim 1, wherein said desired destination is inputted according to class or by code number.

4. The system according to claim 1, wherein the desired destination and the map information is stored in a CD-ROM.

5. A navigation system for a vehicle having a position input system for assisting vehicle navigation to a desired destination, which comprises:

input means for inputting a present position in terms of characters or code numbers and for inputting said desired destination by first selecting a class of destinations and then selecting a destination from the selected class;

memory means for storing information about said desired destination and map information; said map information including intersection and road data, and a landmark located between intersections;

display means for displaying guidance information; and control means for controlling said display means to firstly display a plurality of classes of destinations and secondly to display destinations corresponding to said selected class of destinations, wherein said displayed destinations are in response to the selection of said class of destinations causing said destinations to be displayed on said display means, and said desired destination is selected by identifying one of said destinations displayed on said display means;

and wherein said desired destinations information includes a list of desired destinations each having classification data corresponding to one of said plurality of classes of destinations, and said displayed destinations are selected by determining destinations in said list of desired destinations which have classification data corresponding to said selected class.

* * * * *